United States Patent [19]

Sarkoezi

[11] Patent Number: 5,099,501
[45] Date of Patent: Mar. 24, 1992

[54] ARRANGEMENT FOR SWITCHING A CLOCK TO A CLOCK HAVING THE SAME FREQUENCY BUT A LAGGING CLOCK PHASE

[75] Inventor: Imre Sarkoezi, Munich, Fed. Rep. of Germany

[73] Assignee: Siemens Aktiengesellschaft, Munich, Fed. Rep. of Germany

[21] Appl. No.: 441,882

[22] Filed: Nov. 27, 1989

[30] Foreign Application Priority Data

Nov. 15, 1988 [EP] European Pat. Off. ........ 88119040.0

[51] Int. Cl.⁵ ............................................. H03D 3/24
[52] U.S. Cl. .................................. 375/119; 375/118; 328/63; 328/55
[58] Field of Search ....................... 375/119, 120, /118; 377/78; 328/55, 63, 155, 134; 307/269, 511

[56] References Cited

U.S. PATENT DOCUMENTS

| | | | |
|---|---|---|---|
| 4,604,582 | 8/1986 | Strenkowski et al. | 328/55 |
| 4,841,548 | 6/1989 | Volejnik | 375/110 |
| 4,841,551 | 6/1989 | Ajaneas | 375/118 |
| 4,942,590 | 7/1990 | Terada | 375/119 |
| 4,975,929 | 12/1990 | Apple et al. | 375/119 |

FOREIGN PATENT DOCUMENTS 0334193 9/1989 European Pat. Off. .
0339515 11/1989 European Pat. Off. .

Primary Examiner—Douglas W. Olms
Assistant Examiner—Ralph Smith

[57] ABSTRACT

A circuit arrangement has a control logic stage, a clock monitoring stage, and a clock selector stage. The control logic stage includes a shift register having register cells that are identical with the exception of the first. The identical shift registers have a D-flip-flop in which a pre-control signal is formed by intermediate storage of a control signal. A pre-control signal arises in the first register cell when all other pre-control signals are absent. The switching ensues dependent on a correction signal and the clocks at the affected registered cells such that the previous control signal is first disconnected before the new control signal is engaged. In the clock selector stage, the active control signal through-connects the allocated clock as auxiliary data clock. The clock monitoring stage generates a start signal when either no control signal is present or when a plurality of control signals were erroneously formed at the same time. Such a circuit arrangement is employable in the clock recovery in digital signal multiplex devices.

8 Claims, 4 Drawing Sheets

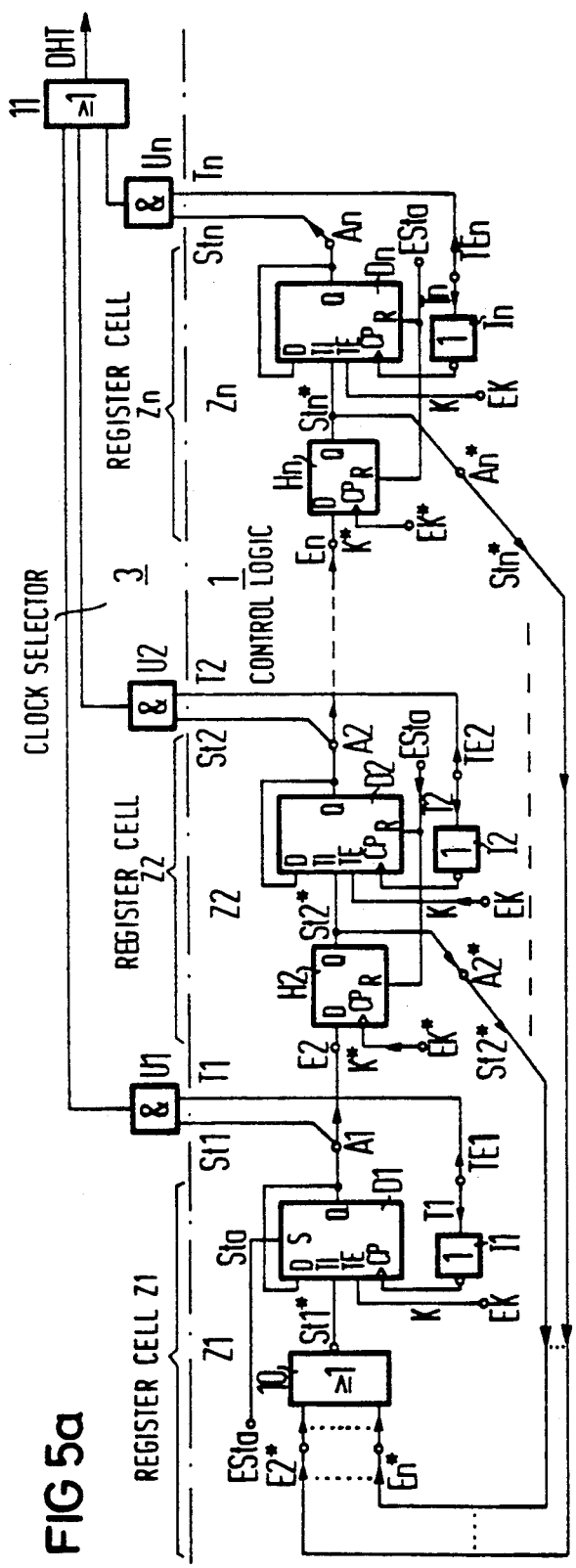
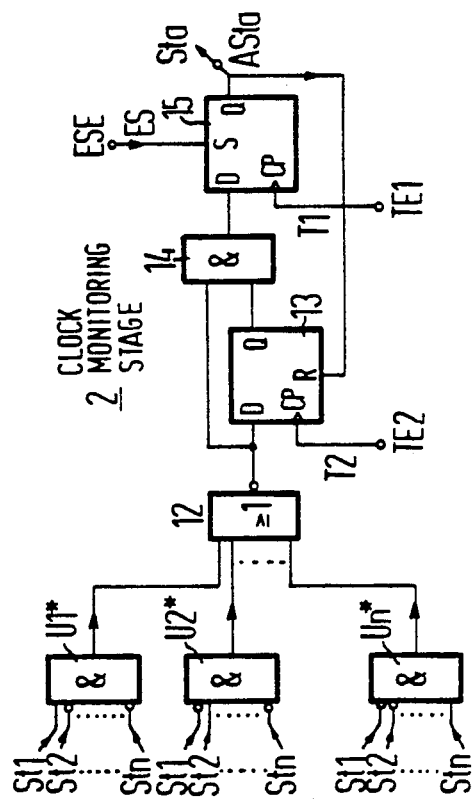
FIG 5a
FIG 5b

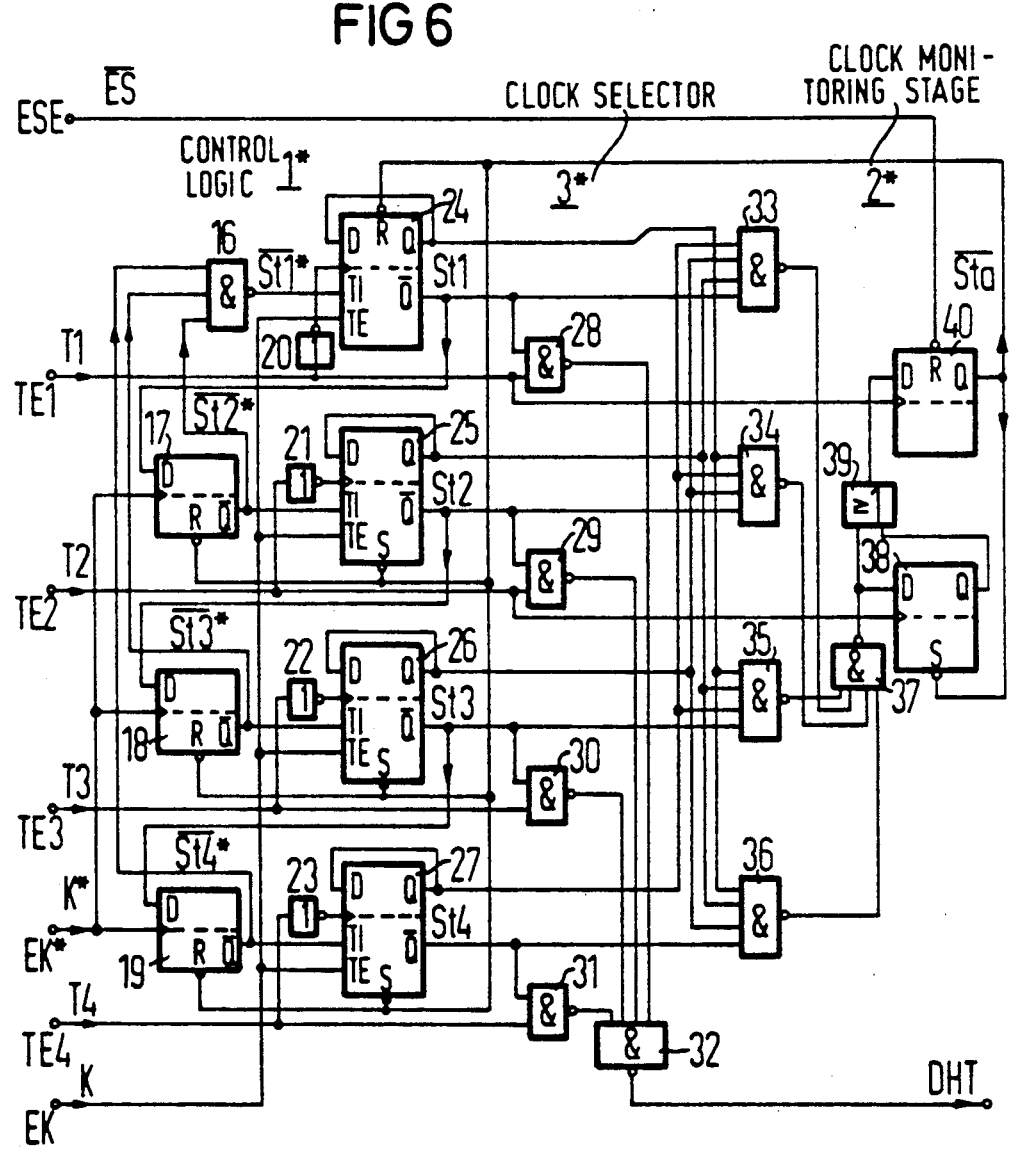

ARRANGEMENT FOR SWITCHING A CLOCK TO A CLOCK HAVING THE SAME FREQUENCY BUT A LAGGING CLOCK PHASE

BACKGROUND OF THE INVENTION

1. Field of the Invention

The present invention relates to an integrated circuit for switching clock signals having the same phase spacing and same frequency as one another to clock signals having a non-synchronized clock phase.

2. Description of the Prior Art

A known integrated circuit for switching a clock to a clock having a leading clock phase is disclosed in European Application 88116125.1. In this circuit, a switch-over arrangement is included which contains a shift register ring composed of register cells. Each of these contains a D-flipflop that is fed back into itself via an OR gate and, via another OR gate preceding the reset input, is fed back to all other register cells with the exception of that register cell preceding in shift direction. As a result, an "H" status can occur at only one register cell in the shift register ring. A clock monitoring starts the shift register ring upon initialization and again when none of the register cells outputs a control signal as a consequence of a disturbance.

European Published Application 0 275 406 A1 discloses a method and arrangement for recovering the clock and/or the clock phase of a synchronous or plesiochronic digital signal. The arrangement contains an auxiliary clock generator that generates auxiliary clock signals having the same frequency but a different phase relation. Of these, one is selected as auxiliary data clock or recovered clock in a phase correction circuit. These auxiliary clocks fundamentally deviate in frequency from the auxiliary clock to be formed. A phase sensor checks whether the effective signal edges of the digital signal and of the auxiliary data clock have approached one another to less than a defined chronological spacing. As soon as this is the case, it outputs a correction signal. This initiates a phase shifting of the auxiliary data clock in the phase correction circuit by switching between the derived auxiliary clocks.

As disclosed in German Application P 38 09 606.4, the phase of a binary data signal can be continuously adapted to a central clock. A sequence of auxiliary data signals is generated by clocking the data signal with auxiliary clocks. These auxiliary data signals have phase spacings identical to one another with the frequency of the central clock. One of these serves as an adapted data signal. The selection of this data signal and the phase ensues such that pulse width distortions and jitter of the data signal do not have any influence in the clocking.

In German Application P 38 14 640.1, a method and arrangement for clock recovery from a data signal by continuous adaptation of a locally generated clock to a data signal is disclosed. Here, an auxiliary clock generator generates a sequence of auxiliary clocks. These have approximately the same frequency or have the same frequency corresponding to the bit rate of the data signal. These auxiliary clocks have identical phase spacings. A phase detector compares the data signal to the auxiliary clocks and a control logic selects one of these as clock via a switch-over means. That auxiliary clock, to which a switch can be undertaken synchronously and spike-free is selected.

SUMMARY OF THE INVENTION

An object of the invention is to provide an arrangement for switching a clock onto another having the same frequency and lagging clock phase.

The above object can be achieved in a circuit constructed in accordance with the principles of the present invention. This arrangement is capable of being executed in integrated fashion, is able to work with high switching speeds, is able to switch spike-free and is simpler for most applications than the prior art arrangements.

Integrated circuits exhibit switching speeds of their active elements that differ from copy to copy, these switching speeds varying even more considerably due to fluctuations of temperature and supply voltage. Further, the circuit configuration causes different line lengths between cooperating, active elements. At high bit rates, the switching events cannot be chronologically coordinated with adequate precision for the aforementioned reasons. As a result, spikes arise at switchover.

To solve these problems, the present invention is provided having complete clock recovery that is based on the principle of control involving a phase correction stage that is employable in a clock recovery that uses the principle of regulation. This phase correction stage requires a correction signal which proceeds in only one direction.

The present invention can be advantageously realized in CMOS technology and, in particular, is suitable for bit rates equal to or higher than 34 Mbits/s.

DESCRIPTION OF THE DRAWINGS

FIG. 5a shows a circuit diagram of the control logic of the invention including a clock selector stage;

FIG. 5b shows a circuit diagram of the clock monitoring stage of the invention;

FIG. 6 shows an embodiment of the invention; and

DETAILED DESCRIPTION OF THE PREFERRED EMBODIMENTS

Figure 1:
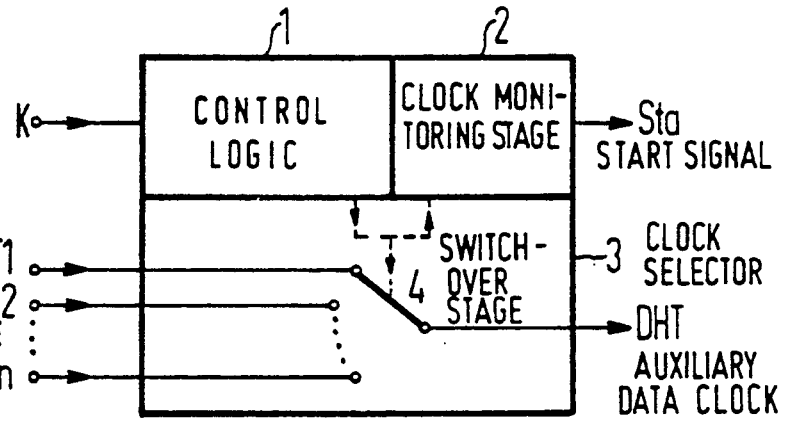
FIG. 1 shows a block circuit diagram of the present invention.

The block circuit diagram of the arrangement of the invention in FIG. 1 contains a control logic 1, a clock monitoring stage 2 and a clock selector stage 3 comprising switch-over stage 4.

Clocks T1-Tn that have the same frequency and have the same spacings in succession are applied to the switch-over stage 4. The switch-over stage 4 is capable of through-connecting one of these clocks to be referred to as auxiliary data clock DHT. With a correction signal K, the control logic 1 can be given the command to switch the switch-over stage 4 from a clock Tx being currently through-connected to the clock Tx+1 having a lagging phase. The clock monitoring stage 2 is capable of initially starting the arrangement with a start signal Sta once. It also checks whether only one of the clocks T1-Tn is in fact through-connected and, if not, again starts the arrangement with an identical start signal Sta.

Figure 2:
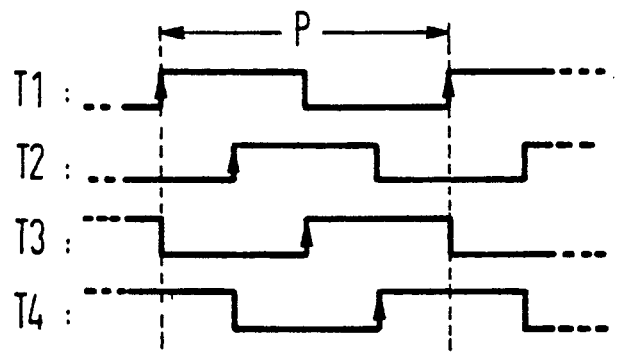
FIG. 2 shows a pulse plan of four clocks used in the arrangement of FIG. 1 that are phase-shifted relative to one another.

FIG. 2 shows four clocks T1 through T4 (n=4) and their phase-related shift relative to one another during a period P.

Figure 3:
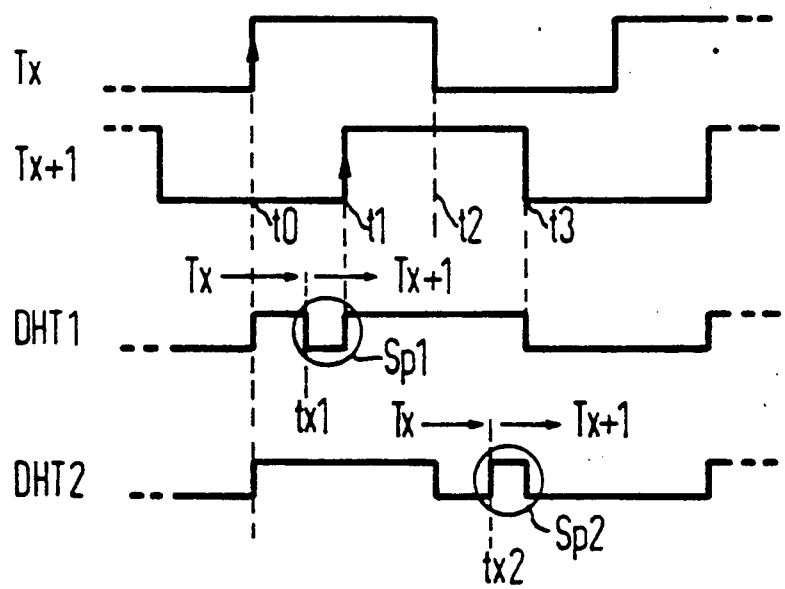
FIG. 3 shows a pulse plan for explaining the creation of spikes.

FIG. 3 shows a pulse plan for explaining the switching from one clock Tx to a clock Tx+1. Two occurrences of switching shall be set forth with reference to two auxiliary data clocks DHT1 and DHT2. Beginning at point in time t0, these two auxiliary data clocks DHT1 and DHT2 and clock Tx have a "H" status (high).

When the switching onto the clock Tx+1 ensues at point in time tx1, the auxiliary data clock DHT1 and clock Tx+1 assume an "L" condition (low) that lasts until the point in time t1 at which the clock Tx+1 and auxiliary data clock DHT1 again change to the "H" status. The pulse pause between the points in time tx1 and t1 is a spike Sp1.

In the second occurrence, the auxiliary data clock DHT2 and clock Tx have an "L" status after the point in time t2. This lasts until the switching time tx2, when the auxiliary data clock DHT2 and clock Tx+1, changes into an "H" status that lasts until point in time t3. The pulse of the auxiliary data clock DHT2 between the points in time tx2 and t3 is a spike Sp2.

A spike-free switching can be achieved when the two clocks Tx and Tx+1 are not simultaneously switched. Rather, the disconnect of the clock Tx is triggered at point in time t2 after the conclusion of its "H" status and the engagement of the clock Tx+1 is triggered at point in time t3 after the conclusion of its "H" status. The switch events can thus last half a period up to the end of the period. The two clocks Tx and Tx+1 are disconnected between the points in time t2 and t3. As a result, the "L" status in the auxiliary data clock DHT2 is lengthened by one-fourth of a period between time t2 and time t3.

Figure 4:
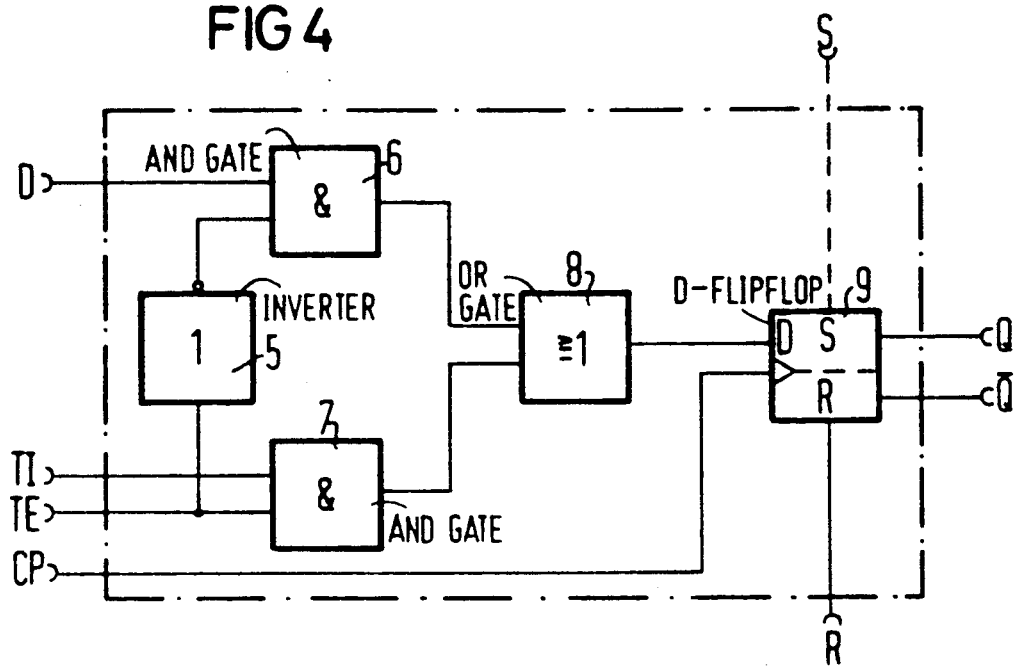
FIG. 4 shows a D-flipflop with test inputs.

FIG. 4 shows the circuit diagram of a commercially available D-flipflop including test inputs as employed in the following figures. It contains an inverter 5, AND gates 6 and 7, an OR gate 8 and a D-flipflop 9. The arrangement contains a D-input, a test input TI, a test enable input TE, a clock input CP, a reset input R or a setting input S, a Q-output and a $\overline{Q}$-output The ability to accept signals by the D-input and the TI-input can be activated with the TE-input.

FIGS. 5a and 5b show the arrangement of the invention in detail. FIG. 5a contains the control logic 1 and the clock selector 3; FIG. 5b contains the clock monitoring 2. When the reference characters are composed of an upper case letter and a numeral, the former letter indicates the element and the latter letter indicates the order number of the register cell and the control signal that is allocated to the element, "x" stands for an arbitrary number in the order number range 1 through n.

The control logic 1 is a shift register that is composed of register cells Z1 through Zn. The register cell Z1 contains a D-flipflop D1 with test inputs, an inverter I1 and an NOR gate 10. The register cells Z2 through Zn respectively contain a D-flipflop D2 through Dn comprising test inputs, an inverter I2 through In and a D-flipflop H2 through Hn.

The D-flipflops H2 through Hn and the NOR gate 10 prepare the switching and the D-flipflops D1 through Dn execute the actual switching.

When a control signal Stx in the "H" status is adjacent to one of the D-flipflops H2 through Hn, it is forwarded to the Q-output with the next, positive signal edge of pre-correction signal K* and appears at the Q-output as a pre-control signal Stx+1*. When the control signal Stn has a "H" status, the pre-control signals ST2* through STn* do not have a "L" status until after the leading edge of the pre-correction signal K* and a pre-control signal St1* in the "H" status appear at the output of the NOR gate 10.

The D-flipflops D1 through Dn are switched into the D-mode by a "L" status of the correction signal K and assume their own status from clock period to clock period to the Q-D connection. Given a "H" status of the correction signal K, the D-flipflops D1 through Dn are switched into the test mode. In this test mode, they transmit a logical status corresponding to the pre-control signals StI* through STn* from the TI-input to the Q-output when a negative edge of the appertaining clock T1 through Tn appears and the control signal St1 through Stn is formed as a result.

When the control signal Stx has the "H" status at the arrival of the correction signal K, the control signal STx+1 arises in the register cell Zx+1 when a negative edge of the clock Tx+1 appears at the input of the inverter Ix+1. Since the negative edge of the clock Tx already appeared earlier (1/n of the period) in the register cell Zx, the control signal Stx was likewise previously disconnected.

The clock selector 3 contains AND gates U1 through Un and an OR gate 11. When only the control signal Stx+1 appears, the AND gate Ux+1 through-connects the clock Tx+1 to the OR gate 11. The output of OR gate 11 has been again, a through-connected clock, is referenced as auxiliary data clock DHT.

FIG. 5b shows the clock monitoring stage 2. This contains AND gates U1* through Un*, a NOR gate 12, D-flipflops 13 and 15 as well as an AND gate 14.

The AND gates U1* through Un* and the NOR gate 12 form a decoder for control statuses that are not allowed. At each of the AND gates U1* through Un*, the control signal of the same order number is applied to a non-inverting input, whereas all other control signals are connected to an inverting input. The control signal Stx is through-connected as a result thereof when all other control signals are in the "L" status. When, however, all control signals St1 through Stn have a "L" status or multiply have the "H" status due to a malfunction, an "H" status arises at the output of the NOR gate 12. This is read into the D-flipflop 13 with the positive edge of the clock T2, the Q-output of this D-flipflop 13 changes into a "H" status. The AND gate 14 operates the D-input and the Q-output of the D-flipflop 13. When both signals are in the "H" status, the D-input of the flipflop 15 receives the same status. This is accepted by the D-flipflop 15 with the positive edge of the clock T1 and an "H" status arises at the output of this D-flipflop 15 denoting an active start signal Sta. All D-flipflops H2 through Hn and D2 through Dn are reset with this start signal Sta and the D-flipflop D1 is set therewith.

With a setting signal ES for a test via the setting input S of the D-flipflop 15, the start signal Sta can be activated at any time and the initial condition of the control logic 1 can be produced.

FIG. 6 shows a preferred embodiment of the invention in integrated CMOS technology for four clocks T1 through T4. A control logic 1* contains a NAND gate 16, D-flipflops 17 through 19, inverters 20 through 23 and D-flipflops 24 through 27 with test inputs. The clock monitoring stage 2* contains NAND gates 33 through 37, D-flipflops 38 and 40 as well an OR gate 39; the clock selector 3* contains NAND gates 28 through 32.

For speed reasons, the faster gate type is preferred in integrated circuit technology and partly Q-outputs, partly $\overline{Q}$-outputs of the given D-flipflops are preferred. By changing logic, OR gates can be replaced with NAND gates, AND gates can be replaced with NOR gates and Q-outputs can be replaced with $\overline{Q}$-outputs. Further, logic changes due to different edge steepnesses occur at the status changes from "L" status into the "H" status and conversely in different integrated elements.

The preferred embodiment of FIG. 6 is correspondingly modified in comparison to that of FIGS. 5a and 5b.

In contrast to the D-flipflops H2 through Hn in FIG. 5a, the Q-output is used at the D-flipflop 17 through 19. The NOR gate 10 is replaced by a NAND gate 16. In contrast to the D-flipflops D1 through Dn, the Q-output as well as the $\overline{Q}$-output are used at the D-flipflops 24 through 27. The clock selector 3* and the decoder part 33 through 37 of the clock monitoring stag 2* are constructed with NAND gates. In the D-flipflops, reset input and setting input are interchanged in comparison to D-flipflops H2 through Hn and the AND gate 14 is replaced by an OR gate 39. Even though the logic has been changed, FIG. 6 performs the same function as the arrangement in FIG. 5a.

Figure 7:
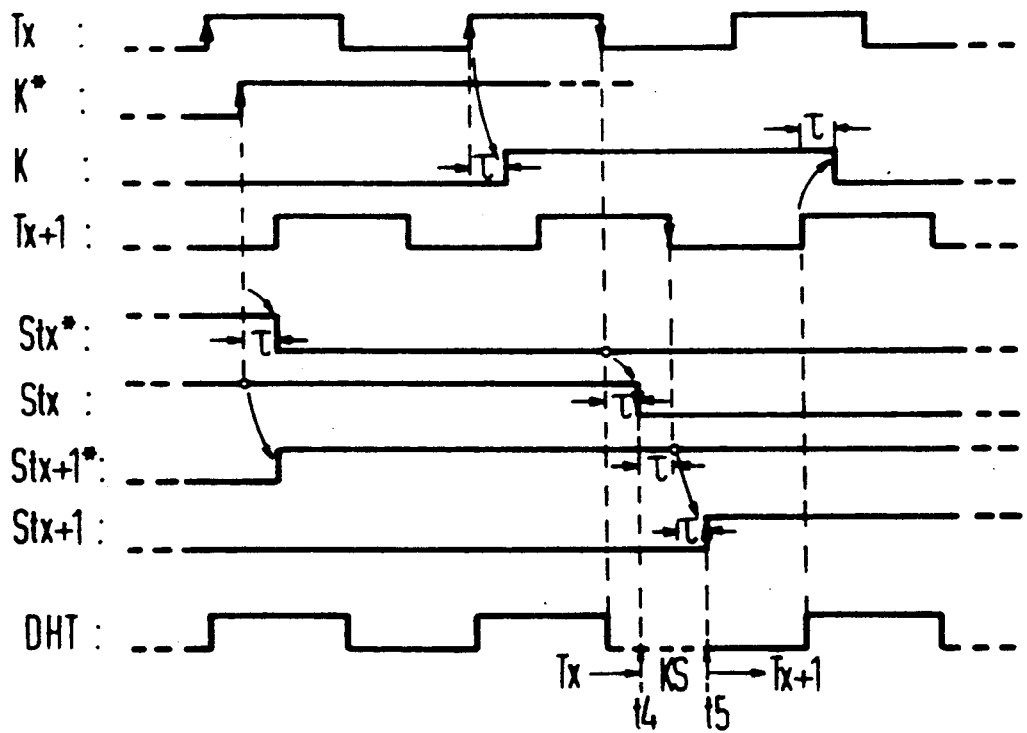
FIG. 7 shows a pulse plan related to the embodiment in FIG. 6.

The pulse plan of FIG. 7 demonstrates a switching in the arrangement of FIG. 6 from a clock Tx to a clock Tx+1. Internal running times are thereby taken into consideration and are being assumed to be identical for reasons of simplicity. The clock Tx serves as auxiliary data clock DHT up to point in time tl. A pre-correction signal K* already arrives earlier, taking the running time of the D-flipflops 17 through 19 into consideration, than the correction signal K (in the pulse diagram, however, it arrives one period earlier synchronous with Tx), disconnecting the pre-control signal Tx* and engaging the pre-control signal Stx+1*. The correction signal K subsequently appears, causing the control signal Stx to be disconnected at point in time t4 at the next trailing edge of the clock Tx. The control signal Stx+1 is engaged at point in time t5 with the next trailing edge of the clock Tx+1. From this point in time, the clock Tx+1 serves as auxiliary data clock DHT. The time span between the points in time t4 and t5 contains the correction step KS of 1/n UI=0.25 UI. The transit time τ between the last trailing edge of the clock Tx and the point in time t4 thus has no influence on the auxiliary data clock DHT until point in time t4 encounters the next, leading edge of the clock Tx.

The pre-correction signal K* and the correction signal K are synchronously generated by the auxiliary data clock DHT in a phase detector not pertinent to the present invention.

Although modifications and changes may be suggested by those skilled in the art, it is the intention of the inventor to embody within the patent warranted hereon, all changes and modifications as reasonably and properly come within his contribution to the art.

I claim as my invention:

1. A circuit for phase-shifting a clock signal, comprising:
   a control logic stage including a shift register of a register cell of a first type connected to a plurality of concatenated register cells of a second type;
   a clock selector stage having inputs connected to outputs of said control logic stage and an output forming an auxiliary data clock output; and
   a clock monitoring stage including a bank of AND gates having inputs connected to said control logic stage and outputs connected to a NOR gate, an output of said NOR gate connected to a memory unit, clock inputs connected to clock signals, and an output forming a start signal connected to a setting input of said register cell of the first type.

2. A circuit as claimed in claim 1, wherein said circuit is a CMOS integrated circuit.

3. A circuit as claimed in claim 2, wherein said clock monitoring stage is a CMOS integrated circuit.

4. A circuit as claimed in claim 1, wherein said clock selector stage and said control logic stage are CMOS integrated circuits.

5. A circuit for phase-shifting a clock signal, comprising:
   means for storing control signals having a start signal input and inputs for supplying clock signals;
   correction means connected to said means for storing control signals for disconnecting said control signals for a predetermined amount of time so as to phase shift said clock signals and eliminate the formation of spikes;
   clock selector means connected to said control signals and said clock signals for allocating one of said clock signals to serve as an output auxiliary clock signal;
   clock monitor means connected to said control signals for generating a start signal when said control signals are not present and when said control signals are multiply formed at the same time; and
   means for connecting said start signal to said start signal input of said means for storing control signals.

6. A circuit for phase-shifting a clock signal as claimed in claim 5, wherein said circuit is a CMOS integrated circuit.

7. A circuit for phase-shifting a clock signal,
   a clock selector stage and a control logic stage;
   said control logic stage including a register cell of a first type connected to a plurality of concatenated register cells of a second type;
   said register cell of a first type including a NOR gate having an output connected to a test input of a main flip-flop;
   said main flip-flop having a test enable input forming a correction signal input, a setting input forming a start signal input, a D-input connected to a Q-output and to an input of a first cell of said plurality of concatenated register cells of a second type, and a clock input connected to an output of a first means for inverting;
   said register cells of a second type, each including a main flip-flop, a second means for inverting and an auxiliary flip-flop having a D-input connected to a Q-output of a main flip-flop in a preceding register cell;
   said auxiliary flip-flop having a clock input forming a pre-correction signal input, a reset input connected to a reset input of said main flip-flop and to a start signal input;
   said main flip-flop having a test enable input connected to said correction signal input, a test signal input connected to a Q-output of said auxiliary flip-flop, a D-input connected to a Q-output of said main flip-flop and a clock input connected to an output of said second means for inverting of said register cell of a second type;

said clock selector stage including an OR gate, an AND gate corresponding to said register cell of the first type and a plurality of AND gates corresponding to register cells of a second type;

said AND gate corresponding to a register cell of the first type having a first input connected to said Q-output at said main flip-flop of said register cell of a first type and to a D-input of said auxiliary flip-flop of a following register cell of the second type, and a second input connected to an input of said first means for inverting, forming an input for supplying the first clock signal;

each of said AND gates corresponding to a register cell of a second type having a first input connected to said Q-output of said main flip-flop of said corresponding register cell and to a D-input of an auxiliary flip-flop of a following register cell of the second type, and a second input connected to an input of said second means for inverting, forming an input for supplying a clock signal corresponding to said register cell of a second type;

each of said Q-outputs of auxiliary flip-flop of said register cells of a second type being connected to inputs of said NOR gate; and said AND gates having outputs connected to inputs of said OR gate and an output of said OR gate forming an auxiliary data clock.

8. A circuit for phase-shifting a clock signal as claimed in claim 7, further comprising:

a clock monitoring stage including a bank of AND gates, a NOR gate, first and second monitor flip-flops and a monitor AND gate;

each of said AND gates in said bank having a plurality of inputs respectively connected in inverted fashion to all but one of said first inputs of said AND gates in said clock selector stage;

each of said AND gates in said bank having an input respectively connected in non-inverted fashion to one of said first inputs of said AND gates in said clock selector stage;

said NOR gate having a plurality of inputs respectively connected to outputs of said bank of AND gates;

said first flip-flop having a D-input connected to an output of said NOR gate and to a first input of said monitor AND gate, a clock input connected to said input of said second inverter and to said input for supplying a clock signal, and a reset input connected to a Q-output of said second monitor flip-flop; and said Q-output forming a start signal connected to said start signal input of said control logic stage, said second monitor flip-flop having a D-input connected to an output of said monitor AND gate, a setting input connected to a setting signal input, and a clock input connected to said input of said first means for inverting and to said input for supplying the first clock signal.

* * * * *